F. C. AUSTIN.
TRACTOR.
APPLICATION FILED MAY 16, 1918.
1,402,134.
Patented Jan. 3, 1922.
2 SHEETS—SHEET 2.
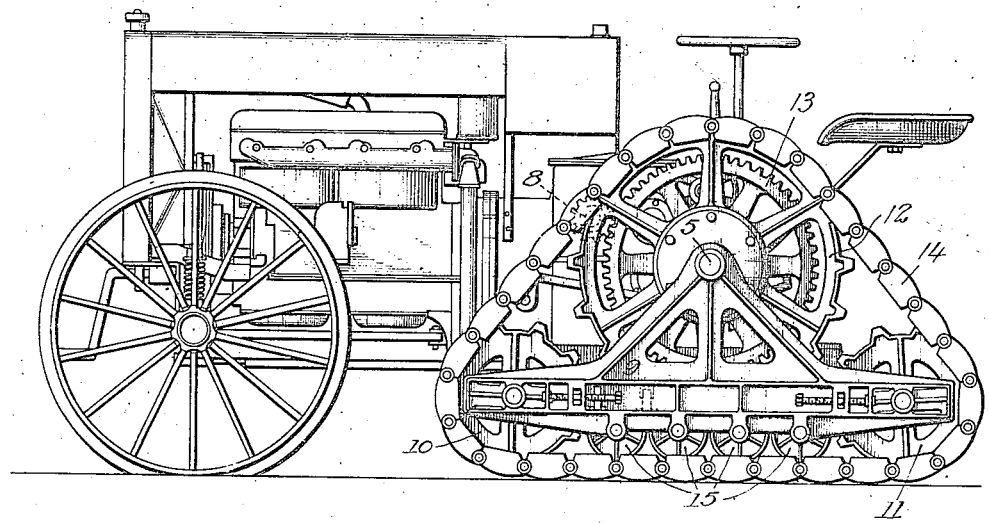
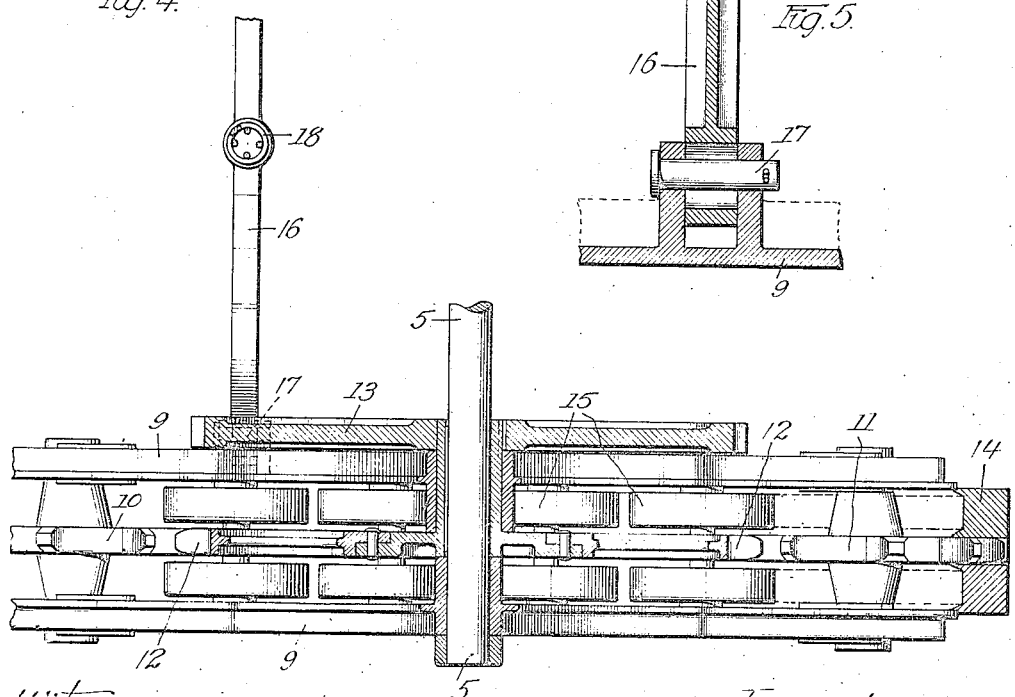

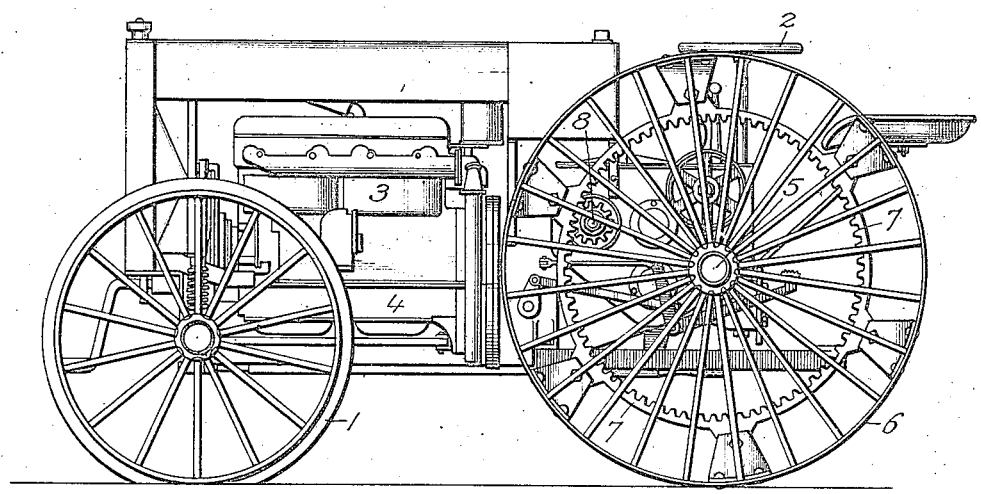
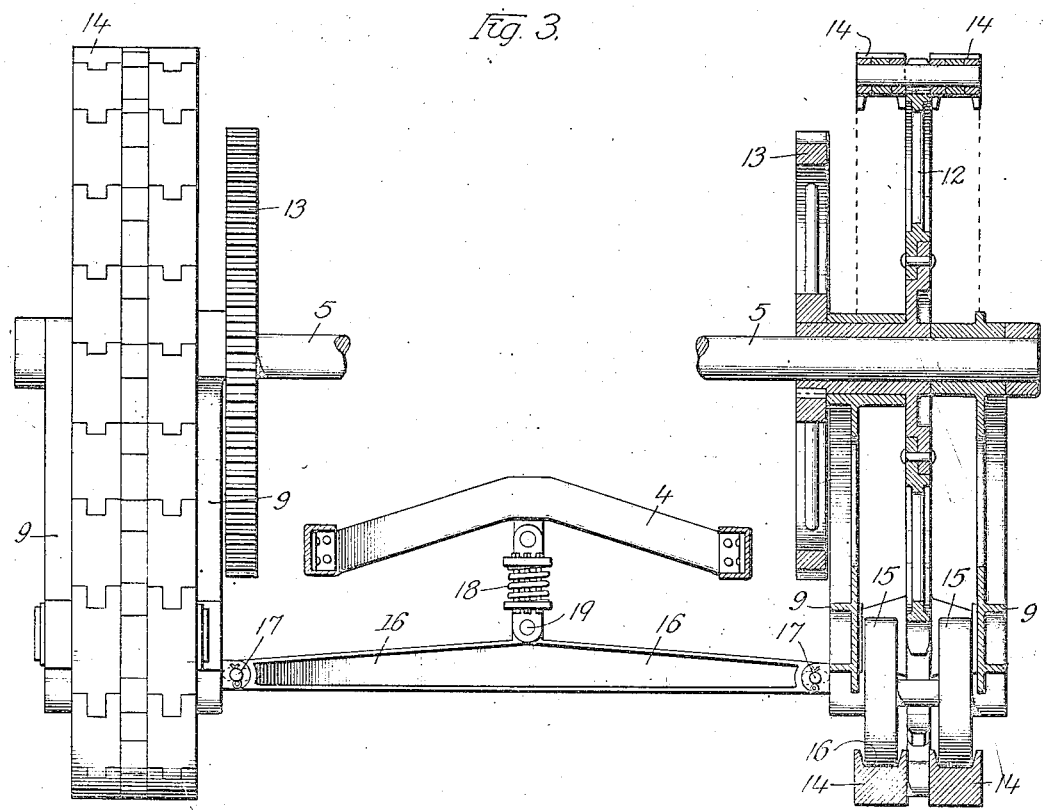

UNITED STATES PATENT OFFICE.

FREDERICK C. AUSTIN, OF CHICAGO, ILLINOIS.

TRACTOR.

1,402,134. Specification of Letters Patent. Patented Jan. 3, 1922.

Application filed May 16, 1918. Serial No. 234,862.

*To all whom it may concern:*

Be it known that I, FREDERICK C. AUSTIN, a citizen of the United States of America, and resident of Chicago, Illinois, have invented a certain new and useful Improvement in Tractors, of which the following is a specification.

In the practical use of tractors, it is found that for some purposes endless belt traction devices are necessary, or at least desirable, while in other cases traction wheels are preferable. Heretofore, therefore, separate tractors have been employed for the different kinds of work, one tractor having traction wheels and another tractor having the belt traction devices.

Generally stated, therefore, one object of this invention is to provide an improved construction and arrangement whereby traction wheels and endless belt traction devices can be used interchangeably on one and the same tractor, the belt traction devices being substituted for the ordinary traction wheels, when occasion requires, and said traction devices being taken off and replaced by the traction wheels when the latter are required, thus enabling one tractor to do the work heretofore done by different tractors, and making it possible for one tractor to practically serve both purposes, thus reducing the cost of equipment for handling work of this kind.

It is also an object to provide certain details and features of construction and combinations tending to increase the general efficiency and desirability of endless belt traction devices of the kind herein shown and described.

To these and other useful ends the invention consists in matters hereinafter set forth and claimed, and shown in the accompanying drawings, in which—

Fig. 1 is a side elevation of a tractor having ordinary traction wheels which can be used interchangeably with the endless belt traction devices herein shown and described, involving the principles of the invention.

Fig. 2 is a side elevation of said tractor, showing the traction wheels removed and replaced by said endless belt traction devices.

Fig. 3 is an enlarged fragmentary or detail view, being in the nature of a cross section through one of said traction devices, and a rear elevation of the other traction device, and showing the connection between these two traction devices.

Fig. 4 is an enlarged horizontal section of one of said traction devices, with the forward end thereof broken away for convenience of illustration.

Fig. 5 is an enlarged detail section on line 5—5 in Fig. 3, showing the method of connecting the transverse bar to the inner sides of the two traction devices.

As thus illustrated, and referring to Fig. 1, the invention comprises a tractor having front steering wheels 1, controlled from the steering wheel 2 through the medium of suitable steering gear, and an engine 3 of any suitable character for driving the tractor. The body frame 4 can be of any suitable or desired character, and the sides of the body are provided at the rear thereof with laterally extending axles 5 for the traction wheels 6, which latter are of the ordinary form. Each traction wheel has an internal gear ring 7 on the inner side thereof, and pinions 8 are provided on the sides of the tractor body to engage these gear rings on the traction wheels. It will be understood that any suitable, known or approved form of power-transmitting device or mechanism can be employed between the engine 3 and the pinions 8, for driving the latter, and that such power-transmitting connection may include an ordinary differential gear (not shown), so that the traction wheels will be driven in the usual and ordinary manner. Thus constructed, the tractor is adapted for certain kinds of work that do not require the endless belt traction devices.

In order, however, that one and the same tractor may be employed for both purposes, endless belt traction devices are provided which can be mounted on the axles 5, and which will be operated by the pinions 8, so that the traction wheels 6 and the said traction devices are adapted to be used interchangeably on one and the same tractor. These traction devices, it will be seen, each comprise a frame or body 9 adapted to tilt on the axle 5, and provided at its front and rear ends with sprocket wheels 10 and 11 of any suitable character. Each traction device is also provided with a sprocket wheel 12 which rotates on the axle 5, and which is rigidly connected in any suitable manner with a large gear wheel 13 arranged in position to engage the pinion 8, whereby the two sprocket wheels 12, one at each side of the tractor, will be rotated when power is communicated thereto from the engine. Each traction device also comprises the traction belt 14 which engages the sprocket wheels 10, 11, and 12, and upon the lower portion of which the body frame 9 is supported by the wheels 15, these wheels being arranged to engage the channel-like tracks 16 formed on the inner surface of the belt. With this arrangement the two belts 14, one at each side of the tractor, are driven by the sprocket wheels 12, which latter rotate on the axles 5 which were occupied by the traction wheels 6 before the latter were removed to make way for the two endless belt traction devices. The belts 14 may be of any suitable or desired construction, being ordinarily composed of links pivotally connected together to form an endless link belt which will travel on the ground.

It is desirable, of course, that the tilting motion of the two traction devices on the axles 5 be limited in some manner, and this is preferably accomplished by connecting said traction devices together by a transverse bar 16 having its ends provided with loose pivotal connections 17 with the inner sides of the frames 9, so that either traction device can tilt upward at its front end or at its rear end without disturbing the position of the other traction device. Preferably, the bar 16 is connected with the body frame 4, or some portion thereof, through the medium of a device 18 which comprises a coil spring which is compressed when the front ends of both traction devices are tilted upward, or which is compressed by the upward movement of the front end of one traction device. This device 18 is preferably pivoted at its lower end at 19 on the bar 16, and its upper end may be likewise pivoted or hinged on the bottom of the body frame or chassis of the tractor. In this way, some of the weight of the tractor is imposed on the traction devices through the medium of the spring device 18, which latter rests on the center of the bar 16, whereby an equalizing effect is obtained, the tendency being to equalize the weight on the two traction devices.

From the foregoing it will be seen that a tractor thus equipped with interchangeable traction wheels and endless belt traction devices can be used for various purposes. At times the belt traction devices are necessary, as in traveling over soft ground, but at other times the traction wheels are preferable, as when the machine is traveling along a road or street, or on hard ground. With the construction shown and described, which is illustrative of the invention, the two kinds of traction means are adapted to be used interchangeably on one and the same tractor, and in this way a complete tractor having traction wheels, and a second complete tractor having endless belt traction devices, is not a necessary requirement. Consequently, the cost of equipment is greatly reduced.

Furthermore, the belt traction devices shown and described are strong and compact, and operate in a satisfactory and advantageous manner, in addition to the fact that they are especially adapted to be used interchangeably with traction wheels.

From the foregoing it will be seen that the height of the endless belt structures above the axles is less than the distance from the axles to the bottom of each of said structures. In other words, the distance downwardly from the axles to the bottom of each belt traction device is the same as the radial dimension of the traction wheels with which said devices are interchangeable, notwithstanding that the belt traction devices are of less height than the wheels. In this way the belts and their supporting structures present very little weight above the axles as compared with the weight thereof below the axles, but are at the same time adapted to be used interchangeably with the round traction wheels which are of much greater height. Thus the belt structures and the wheels support the axles at the same distance from the ground notwithstanding the difference in height between said structures and the traction wheels, thus insuring the desired results and the desired interchangeability of the belt traction devices with ordinary traction wheels and notwithstanding that said belt traction devices are constructed with most of their weight below the axles and with comparatively little weight above the axles.

What I claim as my invention is:

1. A tractor, provided with driving gear mechanism, axles disposed in such position that traction wheels placed thereon will be operated by said mechanism, and endless belt traction devices adapted to rock on said axles, and having means to engage said mechanism, said devices being of less height above the axles than said wheels, but the distance from the axles to the bottom of each said device being the same as the radial dimension of the wheels so that said wheels and said endless belt traction devices are interchangeable on said tractor notwithstanding that said devices are of less height than said wheels.

2. A tractor, provided with driving gear mechanism, axles disposed in such position that traction wheels placed thereon will be operated by said mechanism, and endless belt traction devices adapted to rock on said axles, and having means to engage said mechanism so that said wheels and said devices are interchangeable on said tractor, said mechanism including a pinion adjacent each axle and said endless belt traction device comprising gear wheels for rotation on said axles to engage said pinions, sprockets rigid with said gear wheels, frames to tilt on said axles, idlers on said frames, endless belts on said sprockets and idlers, and means below said sprockets to support said frames on the lower portions of said belts.

3. A tractor, provided with driving gear mechanism, axles disposed in such position that traction wheels placed thereon will be operated by said mechanism, and endless belt traction devices adapted to rock on said axles, and having means to engage said mechanism so that said wheels and said devices are interchangeable on said tractor, said endless belt traction devices comprising members to rotate on said axles, frames to tilt on said axles, sprockets on said frames, endless belts on said members and sprockets and means below said members to support said frames on the lower portions of said belts.

4. A tractor, provided with driving gear mechanism, axles disposed in such position that traction wheels placed thereon will be operated by said mechanism, and endless belt traction devices adapted to rock on said axles, and having means to engage said mechanism so that said wheels and said devices are interchangeable on said tractor, said mechanism including a pinion adjacent each axle, said wheels having internal gear rings to engage said pinions, said traction devices having sprockets provided with gear wheels to engage said pinions, and means to support said gear wheels in engagement with said pinions and said sprockets out of engagement with the lower portions of said belts.

5. In a tractor, the combination of driving mechanism, axles adjacent said mechanism, rotary members on said axles, tilting frames on said axles, rotary members on said frames, endless traction belts on said members, means to support said frames on the lower portions of said belts, serving to support said members out of engagement with the lower portions of said belts, and means including gears on said axles to engage said mechanism to drive said belts.

6. A structure as specified in claim 5, and a transverse connection between the two endless belt traction devices, having means to support the tractor thereon.

7. In combination with a tractor having axles and power transmitting devices for ordinary traction wheels, a pair of endless belt traction devices adapted to rock on said axles and having means to receive power from said power transmitting devices, to drive the tractor, a connection between said traction devices and means to support the tractor on the middle portion of said connection.

8. In a tractor, the combination of axles, sprocket wheels on said axles, gear wheels rigid with said sprocket wheels, tilting frames on said axles, rotary members on said frames, endless traction belts extending around said members and said sprocket wheels, so that the sprocket wheels engage only the upper portions of the belts, and pinions engaging said gear wheels to drive the traction belts, the entire load weight communicated to said axles being sustained by said frames.

9. A structure as specified in claim 8, in combination with a transverse bar connecting said frames together, means to connect the middle portion of the bar with the body of the tractor, substantially as shown and described.

10. A tractor provided with driving gear mechanism, axles disposed in such position that traction wheels placed thereon will be operated by said mechanism, and endless belt traction devices adapted to rock on the axles and having means to engage said mechanism so that said wheels and said devices are interchangeable on said tractor, and means extending across beneath the tractor for connecting traction units at opposite sides.

Signed by me at Chicago, Illinois, this 9th day of May, 1918.

FREDERICK C. AUSTIN.